(12) United States Patent
Amann et al.

(10) Patent No.: US 10,394,467 B2
(45) Date of Patent: *Aug. 27, 2019

(54) FLEXIBLE DEPLOYMENT AND MIGRATION OF VIRTUAL MACHINES

(71) Applicant: International Business Machines Corporation, Armonk, NY (US)

(72) Inventors: Stefan Amann, Boeblingen (DE); Gerhard Banzhaf, Nufringen (DE); Ralph Friedrich, Sindelfingen (DE); Muthumanikandan Nambi, Bangalore (IN); Kishorekumar G. Pillai, Bangalore (IN); Parakh P. Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/428,555

(22) Filed: Feb. 9, 2017

(65) Prior Publication Data
US 2017/0153832 A1  Jun. 1, 2017

Related U.S. Application Data

(63) Continuation of application No. 14/311,440, filed on Jun. 23, 2014, now Pat. No. 9,658,897.

(51) Int. Cl.
*G06F 13/14* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 3/0665* (2013.01);
(Continued)

(58) Field of Classification Search
None
See application file for complete search history.

(56) References Cited

U.S. PATENT DOCUMENTS 6,122,279 A  9/2000  Milway et al.
6,745,281 B1  6/2004  Saegusa
(Continued)

FOREIGN PATENT DOCUMENTS

CN  104579740 A  4/2015
EP  2017711 A2  1/2009
(Continued)

OTHER PUBLICATIONS

Posey, Brien M., "A First Look at Hyper-Vs Virtual Fibre Channel Feature (Part 1)", VirtualizationAdmin.com, Published on Jun. 27, 2013 / Last updated on Jul. 19, 2013, <http://www.virtualizationadmin.com/articles-tutorials/Microsoft-hyper-v-articles/storage-management/first-look-hyperv-vs-virtual-fibre-channel-feature-part1.html>.

(Continued)

*Primary Examiner* — Ilwoo Park
(74) *Attorney, Agent, or Firm* — Aaron N. Pontikos

(57) ABSTRACT

Virtual machines in a computer system cluster, or cloud environment, require access to their assigned storage resources connected to the virtual machines via storage area networks (SAN). Such virtual machines may be independent from associated physical servers in the computer system cluster on which they are deployed. These virtual machines may dynamically migrate among assigned physical servers while maintaining access to their connected storage resources both from the source physical server and the target physical server during the migration.

20 Claims, 12 Drawing Sheets

(51) Int. Cl.
*G06F 9/50* (2006.01)
*G06F 13/40* (2006.01)
*G06F 13/28* (2006.01)
*G06F 13/38* (2006.01)
*G06F 13/42* (2006.01)
*H04L 29/08* (2006.01)
*H04L 29/12* (2006.01)
*G06F 9/455* (2018.01)

(52) U.S. Cl.
CPC ........ *G06F 9/45558* (2013.01); *G06F 9/5088* (2013.01); *G06F 13/28* (2013.01); *G06F 13/385* (2013.01); *G06F 13/4022* (2013.01); *G06F 13/426* (2013.01); *H04L 61/3015* (2013.01); *H04L 67/1038* (2013.01); *H04L 67/1097* (2013.01); *G06F 2009/4557* (2013.01); *G06F 2009/45583* (2013.01); *G06F 2213/0008* (2013.01); *G06F 2213/28* (2013.01); *G06F 2213/3812* (2013.01); *G06F 2213/4004* (2013.01)

(56) References Cited

U.S. PATENT DOCUMENTS

| | | |
|---|---|---|
| 6,847,993 B1 | 1/2005 | Novaes et al. |
| 7,512,133 B2 | 3/2009 | Dugan et al. |
| 7,680,773 B1 | 3/2010 | Acharya et al. |
| 7,693,811 B2 | 4/2010 | Adlung et al. |
| 7,711,979 B2 | 5/2010 | Salli |
| 7,739,415 B2 | 6/2010 | Banzhaf et al. |
| 7,769,913 B1 | 8/2010 | Budhia et al. |
| 7,831,681 B1 | 11/2010 | Salli |
| 7,925,817 B2 | 4/2011 | Uehara et al. |
| 7,970,852 B2 | 6/2011 | Allen et al. |
| 8,429,446 B2 | 4/2013 | Hara et al. |
| 8,483,087 B2 | 7/2013 | Bose et al. |
| 8,554,981 B2 | 10/2013 | Schmidt et al. |
| 8,688,704 B1 | 4/2014 | Horling et al. |
| 8,953,836 B1 | 2/2015 | Postelnicu et al. |
| 9,143,439 B2 | 9/2015 | Wang et al. |
| 9,215,083 B2 | 12/2015 | Johnsen et al. |
| 9,473,353 B2 | 10/2016 | Amann et al. |
| 2002/0049859 A1 | 4/2002 | Bruckert et al. |
| 2002/0124089 A1 | 9/2002 | Aiken et al. |
| 2004/0024732 A1 | 2/2004 | Klisch et al. |
| 2005/0114476 A1 | 5/2005 | Chen et al. |
| 2005/0160413 A1 | 7/2005 | Broussard et al. |
| 2006/0242271 A1 | 10/2006 | Tucker et al. |
| 2008/0209070 A1 | 8/2008 | Horn |
| 2009/0024674 A1 | 1/2009 | Gallagher |
| 2009/0025007 A1 | 1/2009 | Hara et al. |
| 2010/0106723 A1 | 4/2010 | Lee |
| 2010/0250785 A1 | 9/2010 | Shin et al. |
| 2011/0216940 A1 | 9/2011 | Morioka et al. |
| 2012/0030599 A1 | 2/2012 | Butt et al. |
| 2012/0054850 A1 | 3/2012 | Bhardwaj et al. |
| 2012/0079195 A1 | 3/2012 | Bolen et al. |
| 2012/0218990 A1 | 8/2012 | Subramanyan et al. |
| 2012/0254554 A1* | 10/2012 | Nakajima ............ G06F 3/0607 711/154 |
| 2013/0046892 A1 | 2/2013 | Otani |
| 2013/0167206 A1 | 6/2013 | Hiroki |
| 2013/0227566 A1* | 8/2013 | Higuchi ............ G06F 9/45533 718/1 |
| 2013/0254403 A1* | 9/2013 | Taniguchi ............ H04L 47/783 709/226 |
| 2013/0282887 A1 | 10/2013 | Terayama et al. |
| 2014/0059187 A1 | 2/2014 | Rosset et al. |
| 2014/0143398 A1 | 5/2014 | Tameshige et al. |
| 2015/0023213 A1 | 1/2015 | Soneda et al. |
| 2015/0106518 A1 | 4/2015 | Amann et al. |
| 2015/0248251 A1 | 9/2015 | Helman et al. |
| 2015/0295792 A1 | 10/2015 | Cropper et al. |
| 2015/0370610 A1 | 12/2015 | Amann et al. |
| 2015/0370611 A1 | 12/2015 | Amann et al. |
| 2015/0372867 A1 | 12/2015 | Amann et al. |
| 2016/0170901 A1 | 6/2016 | Tsirkin |

FOREIGN PATENT DOCUMENTS

| | | |
|---|---|---|
| WO | 2008103302 A1 | 8/2008 |
| WO | 2010060721 A1 | 6/2010 |

OTHER PUBLICATIONS

IBM, "Method and Apparatus for Flexible Deployment and Migration of Virtual Servers with SAN-attached Storage on a Server Cluster", Nov. 5, 2013, pp. 1-32.

"Best Practices Guide: Emulex Virtual HBA® Solutions and VMware® ESX Server 3.5", How to deploy VMware ESX Server 3.5 on a Fibre Channel Using Emulex Virtual HBA Technology, Copyright © 2007 Emulex, pp. 1-15.

Patent Application GB1318299.3, entitled "Managing Virtual Network Ports", Filed Oct. 16, 2013.

IBM, Appendix P, List of IBM Patents or Patent Applications Treated As Related, dated Feb. 13, 2017, 2 pages.

* cited by examiner

FLEXIBLE DEPLOYMENT AND MIGRATION OF VIRTUAL MACHINES

FIELD OF THE INVENTION

The present invention relates generally to the field of networking, and more particularly to deployment and migration of virtual machines with SAN (storage area network)-attached storage.

BACKGROUND OF THE INVENTION

Conventional networked computers environments for deployment and migration of virtual servers with (SAN)-attached storage are set up as follows. A cluster of physical servers (PS) is configured such that each PS hosts multiple virtual machines, herein referred to as virtual servers (VSs). The VSs access the fiber channel (FC)-SAN-attached storage devices via host bus adapters (HBAs). The VSs are flexibly deployed on different PSs. These VSs are migrated among the PSs within the cluster. The PSs and storage controllers are connected via SANs. A SAN is made up of one, or more, FC switches. The PSs and storage controllers access a SAN by using HBAs. Each HBA has a world-wide unique port name (WWPN). The FC-SAN-attached storage devices are identified with logical unit numbers (LUNs).

Access to the storage devices is controlled via zoning and LUN masking. Zoning defines which ports are able to communicate, including the FC switch ports. LUN masking defines which HBAs can access a particular LUN. HBAs are identified according to their WWPNs.

In a VS environment, the HBAs are conventionally virtualized such that each HBA represents multiple virtual HBAs (vHBAs). Many HBA virtualization techniques exist, including: (i) single root I/O virtualization (SR-IOV) (an extension to the Peripheral Component Interconnect Express (PCIe) standard); (ii) many proprietary methods; and (iii) N_Port ID Virtualization (NPIV). N_Port ID Virtualization is an FC facility allowing multiple N_Port IDs to share a single physical N_Port. This allows multiple FC initiators to occupy a single physical port, easing hardware requirements in SAN design, especially where virtual SANs are used.

SUMMARY

In one aspect of the present invention, a method, a computer program product, and a system for assigning a set of network names to storage access paths of virtual machines accessing storage resources via storage area networks, includes: creating a computer system cluster, defining a virtual machine to be selectively deployed on a computer system of a plurality of computer systems of a computer system cluster, determining a count of storage access paths for the virtual machine, the count being the number of access paths that the virtual machine is able to use on the computer system of the plurality of computer systems with the greatest number of access paths, establishing a plurality of source port names corresponding to the count of storage access paths, and assigning a source port name from the plurality of source port names to each source host adapter of the plurality of computer systems. The source host adapter provides a virtual machine with access to a storage resource in a storage area network. The source port name is used by the virtual machine when deployed on the computer system of the computer system cluster. To migrate virtual machines dynamically from one computer system to another computer system, additional network names providing equivalent storage access capabilities are employed, such that the virtual machine has access to its storage resources from both the source computer system and the target computer system while the migration is performed.

DETAILED DESCRIPTION

Figure 1:
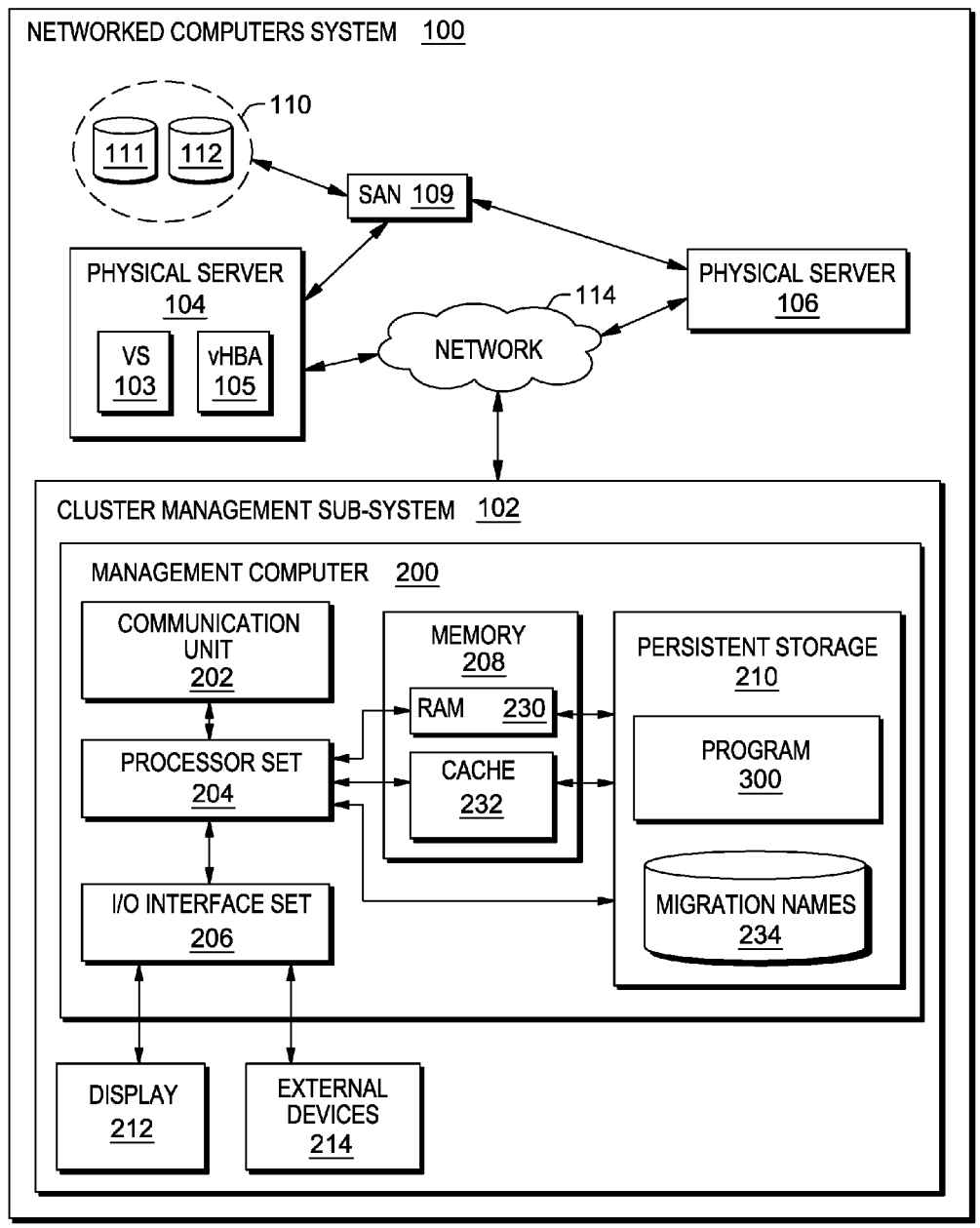
FIG. 1 is a schematic view of a first embodiment of a system according to the present invention.

In a computer system cluster, or cloud environment, virtual machines access fiber channel storage area network (FC-SAN)-attached storage resources via host bus adapters. The virtual machines are flexibly deployed on computer systems of the cluster or cloud, and require access to certain storage resources irrespective of the computer systems on which they are deployed. To migrate virtual machines dynamically from one computer system to another computer system, additional network names providing equivalent storage access capabilities are employed, such that the virtual machine has access to its storage resources from both the source computer system and the target computer system while the migration is performed. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a networked computers system for flexible deployment and migration of VSs with SAN-attached storage on a computer system cluster, generally designated 100, in accordance with one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: cluster management sub-system 102; physical servers (PSs) 104, 106; virtual host bus adapter (vHBA) 105; virtual server (VS) 103; storage area network (SAN) 109; storage controller 110; storage resource 111, 112; communication network 114; management computer 200 ; communication unit 202; processor set 204; input/output (I/O) interface set 206; memory device 208; persistent storage device 210; display device 212; external device set 214; random access memory (RAM) device 230; cache memory device 232; program 300; and migration names store 234.

Networked computers system 100 includes physical servers 104, 106 communicating with cluster management sub-system 102 via network 114. A physical server may be a laptop computer, tablet computer, netbook computer, PC, a desktop computer, a personal digital assistant (PDA), a smart phone, or any programmable electronic device capable of communicating with cluster management sub-system 102 via network 114, and with SAN 109 via vHBA 105. The physical servers are capable of running virtual servers via hypervisors (not shown), and have physical HBAs (not shown) that can be virtualized to a plurality of vHBAs, such as vHBA 105, assigned to virtual servers to access the storage resources via SANs. Storage controller 110, on which HBAs are installed and storage resources are stored (e.g., storage devices 111, 112), communicates with the SANs via HBAs. In the discussion that follows, frequent reference is made to a virtual server, which is one example of a virtual machine. Further, a physical server (PS) is one example of a computer system (CS).

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the other sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in the persistent storage 210 for access and/or execution by one or more of the respective computer processors 204, usually through one or more memories of memory 208. The persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, the persistent storage 210 includes a magnetic hard disk drive. To name some possible variations, the persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with management computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to implement flexible deployment and non-disruptive migration of VSs with SAN-attached storage resources on a server cluster, such as the deployment of VS 103 on PS 104, and migration of VS 103 between PS 104 and PS 106, while maintaining access to its storage resources 111, 112 during the migration. A server cluster is one example of a computer system cluster and will be referred to in examples throughout this detailed description.

Some embodiments of the present invention recognize the following facts, potential problems and/or potential areas for improvement with respect to the current state of the art: (i) VSs with SAN-attached storage resources can be deployed flexibly on PSs in a server cluster/cloud environment, i.e., being able to access their storage resources independent of PSs on which they are running ; (ii) VSs can be dynamically migrated among PSs while retaining access from both the source PS and the target PS to their storage resources via SANs during the migration; (iii) the number of concurrent VS migrations that can be performed requires to be determined; and/or (iv) the dynamic VS migrations can be unlimited.

Figure 2:
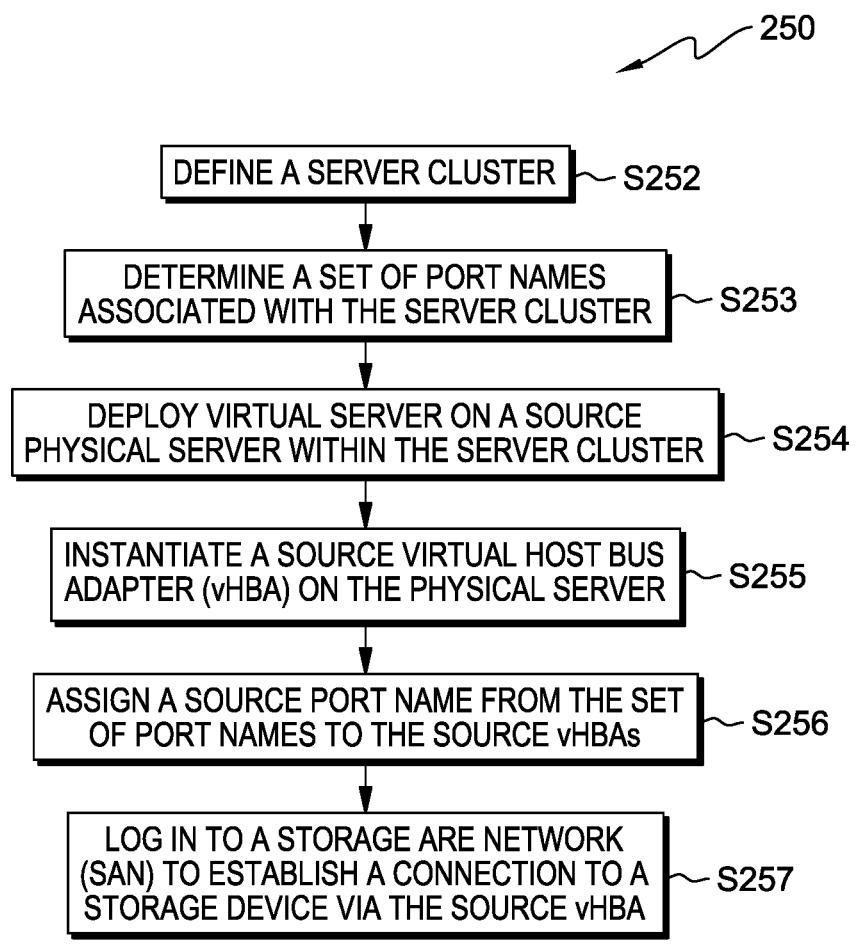
FIG. 2 is a flowchart showing a method performed, at least in part, by the first embodiment system.
Figure 3:
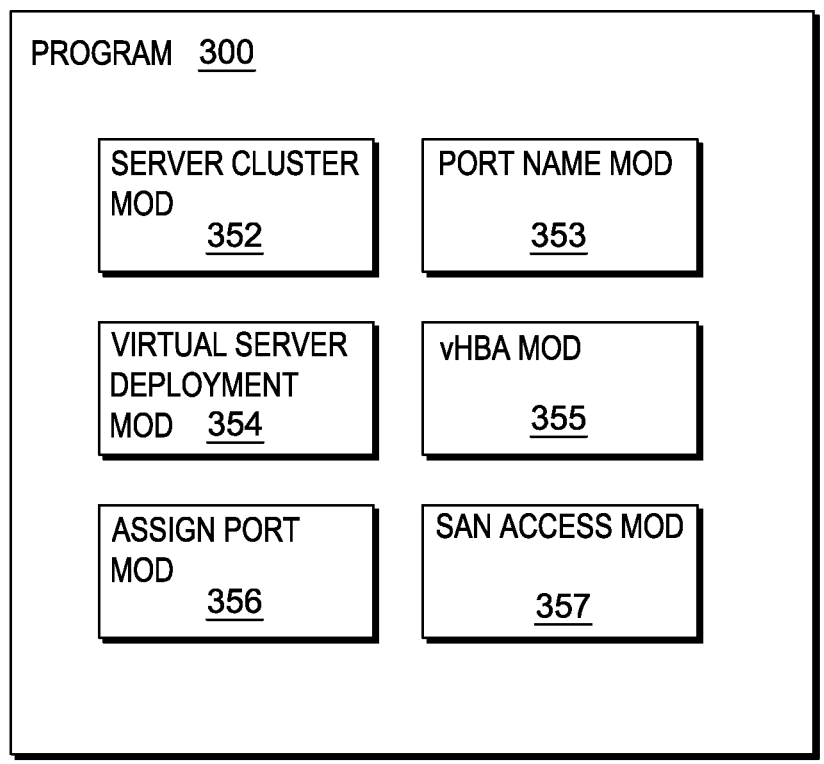
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S252, where server cluster module 352 defines a server cluster (see definition at the end of this detailed description). A server cluster includes, but is not limited to: (i) two physical servers; (ii) a virtual server; (iii) a vHBA; (iv) a SAN; and (v) storage resources. In this example a vHBA is the host adapter through which the virtual machines access the SAN-attached storage. A vHBA is just one example of a host adapter that may be used when practicing some embodiments of the present invention. The server cluster is defined according to the system requirements for deploying virtual servers. A storage access group (SAG), as defined in the present invention, is a logical construct, containing: (i) all virtual servers that shall have equivalent access to a particular set of storage resources; (ii) the physical HBAs that can be used to establish a connection to these storage resources, where these HBAs can be installed on one or multiple physical servers; and (iii) the set of WWPNs that can be assigned to vHBAs instantiated on these physical HBAs in order to access the storage resources. SAGs can be used as a communication vehicle between server, SAN, and storage administrators to consistently set up access rights in the SAN and in storage controller, and accordingly set up vHBA configurations on server side. Without SAGs, individual WWPNs with specific access requirements would have to be communicated between these three classes of administrators, where the meaning and purpose of each individual WWPN may not be obvious. It is within the server cluster that virtual machines are authorized to migrate. In some embodiments of the present invention, the entire networked computers system is defined as the server cluster.

Processing proceeds to step S253, where port name module 353 determines a set of port names associated with the server cluster. A port name is determined for each vHBA for each virtual server in a server cluster. Further, in this example, additional port names are determined according to a pre-determined migration scheme. Migration schemes include: (i) unlimited concurrent migrations; (ii) limited concurrent migrations; and/or (iii) a combination of schemes (i) and (ii). Regardless of the migration scheme, additional port names are generated and stored in migration names store 234. Alternatively, additional port names are generated and stored in migration names store 234, after completion of the full initial deployment of virtual servers on physical servers.

Processing proceeds to step S254, where virtual server deployment module 354 deploys virtual server 103 on source physical server 104, within the server cluster, which is, in this example, networked computer system 100. Deployment of virtual servers is performed in conventional ways and is discussed in more detail below.

Processing proceeds to step S255, where vHBA module 355 instantiates source vHBA 105 on source physical server 104. As discussed in more detail below, the vHBA is conventionally deployed on a physical HBA, located on the physical server. Some embodiments of the present invention employ the vHBA on the physical server to access a SAN and its associated storage resources. Alternatively, some embodiments of the present invention may use physical HBAs (PHBAs) instead of virtualized HBAs to access the SAN. But this considerably limits the number of VSs that can be deployed. For example, if a PS provides two HBAs, only two virtual machines could be running on the PS, where each VS needs only a single path, or one single VS that needs 2 paths. For such embodiments, a further aspect to be considered is the assignment of port names (WWPNs). Port names have been configured for one or more VSs to allow access to its/their storage resources. So, when using a PHBA exclusively for a particular VS, it is required that an appropriate WWPN can be assigned to the PHBA. Often, PHBAs have fixed, burnt-in WWPNs that cannot be dynamically replaced, while WWPNs typically can be dynamically assigned to vHBAs.

Processing proceeds to step S256, where assign port name module 356 assigns a source port name, from the set of port names determined in step S253, to the source vHBA instantiated in step S255. In this embodiment, a single source port name is assigned at this step. Alternatively, and as will be discussed in more detail below, the assignment of a source port name involves the assignment of a pair of port names.

Processing ends at step S257, where SAN access module 357 logs into SAN 109, within the server cluster, to establish a connection to storage resources 111, 112 through source vHBA 105. When access to the storage device is obtained, full deployment of the virtual server is complete. In this example, full deployment is complete when target names are stored in migration names store 234, and SAN access is established with virtual server 103.

Many embodiments of the present invention facilitate migration of virtual server 103, from source PS 104 to target PS 106, while maintaining a connection to storage resources 111, 112. In each scenario described in detail below, a target port name is stored in migration names store 234 for use in migration of the virtual server. In some embodiments, the target port name is permanently paired with the source port name associated with a particular VS. In other embodiments, the target port name and the source port name is a floating name that is used and reused over the course of many migrations.

Some embodiments of the present invention support unlimited migrations of VSs among the PSs in a server cluster. Some embodiments of the present invention implement a limited number of VS migrations, using WWPNs from a WWPN migration pool shared among the PSs in the server cluster. Regardless of the implementation, some embodiments of the present invention may perform one, or more, of the following functions: (i) defining SAGs including VSs and HBAs; (ii) creating a set of WWPNs or WWPN pairs for the VSs of a SAG; (iii) deploying VSs on a particular PS; (iv) instantiating vHBAs on HBAs; (v) assigning WWPNs to vHBAs; and/or (vi) logging in and/or out of SANs.

Figure 4:
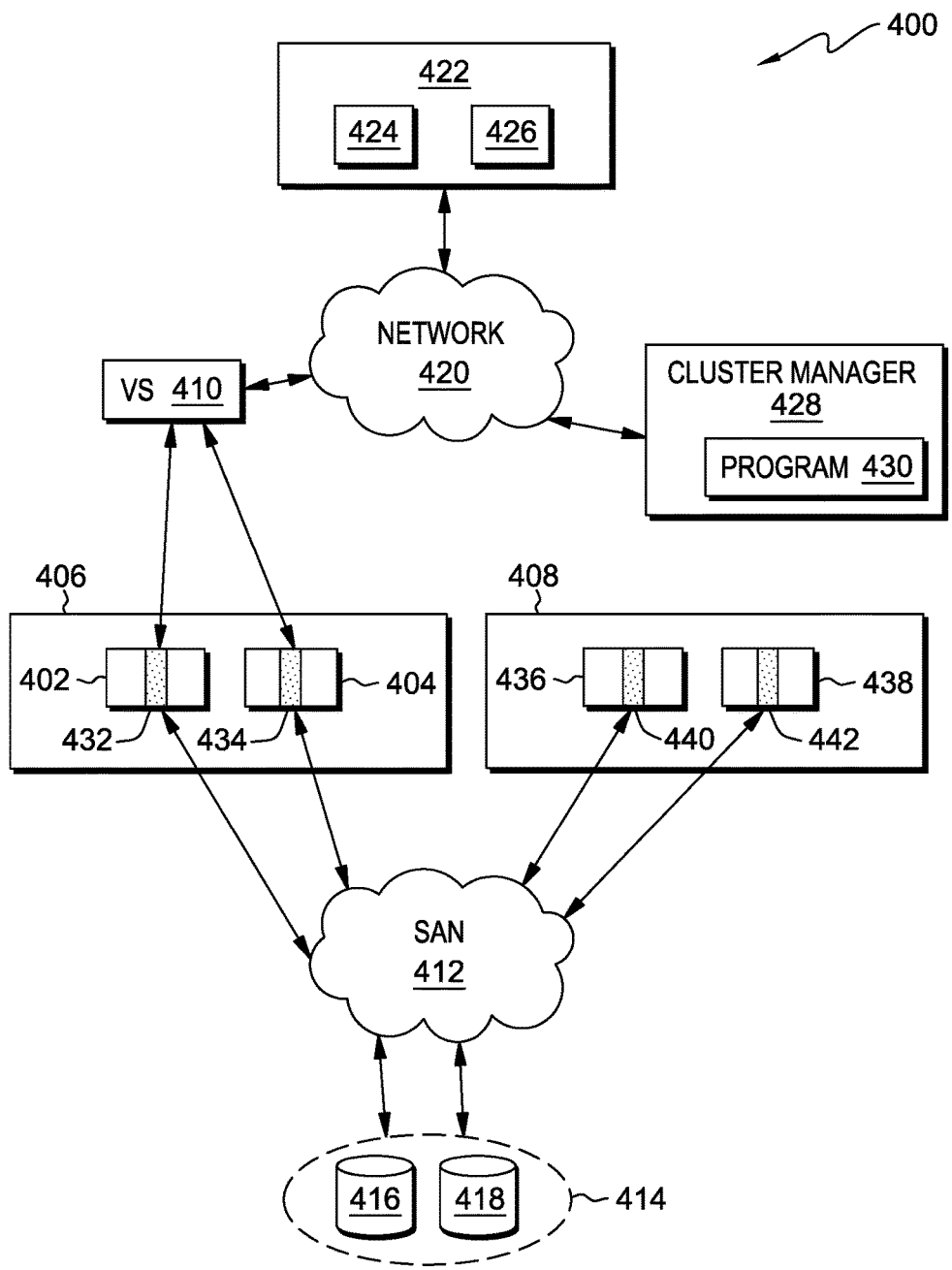
FIG. 4 is a schematic view of a second embodiment of a system according to the present invention.

An example embodiment of a possible hardware and software environment for software and/or methods according to the present invention will now be described in detail with reference to the Figures. FIG. 4 is a functional block diagram illustrating various portions of networked computers system 400 according to this example embodiment, including: cluster manager 428; network 420; WWPN store 422; WWPN pool 424; WWPN pairs 426; physical servers 406, 408; host bus adapters 402, 404, 436, 438; virtual host bus adapters 432, 434, 440, 442; virtual server 410; storage area network (SAN) 412; storage controller 414; storage devices 416, 418; and program 430.

Figure 5A:
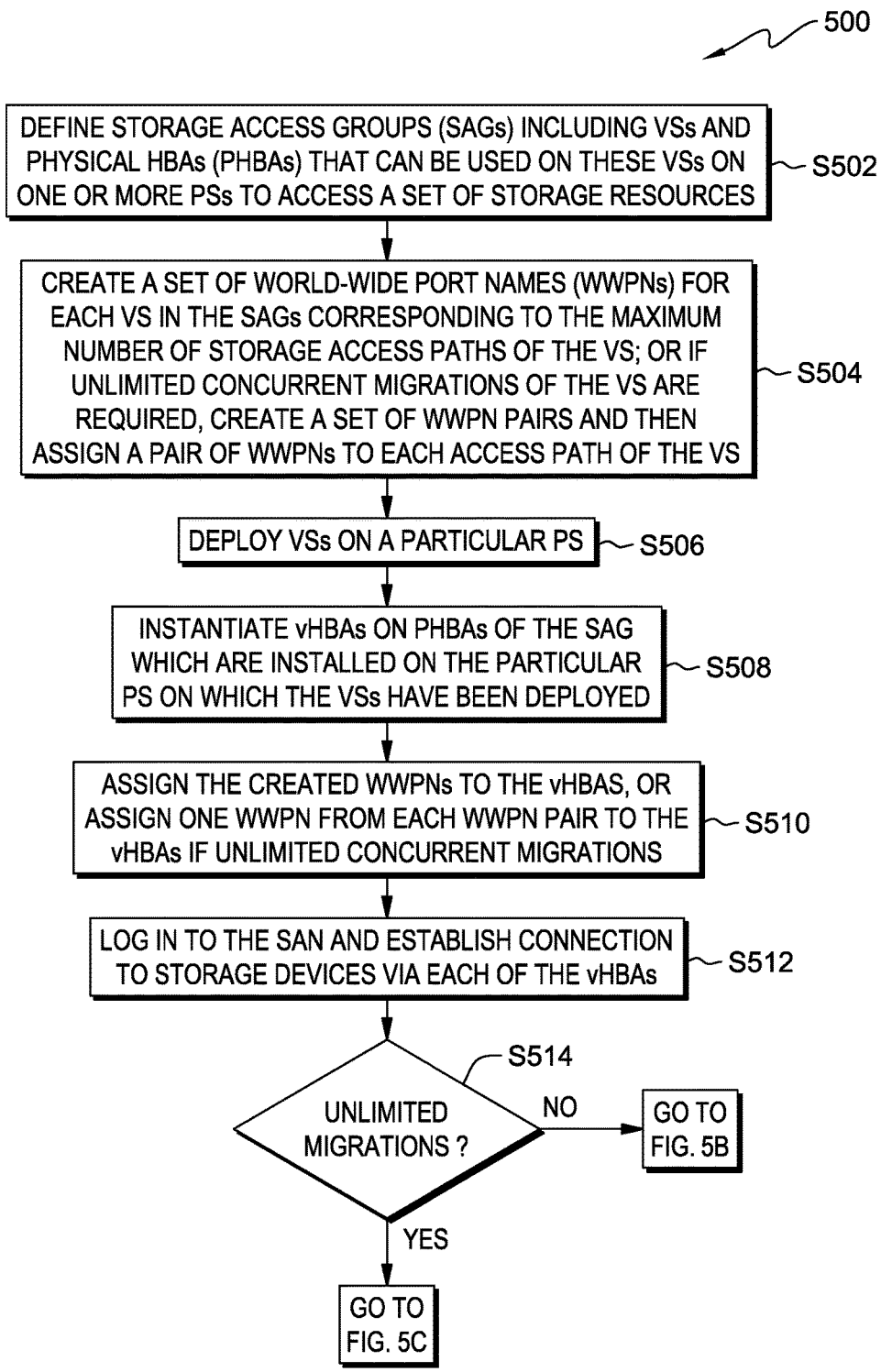
FIGS. 5A, 5B, and 5C are a flowchart showing a method performed, at least in part, by the second embodiment system.
Figure 5B:
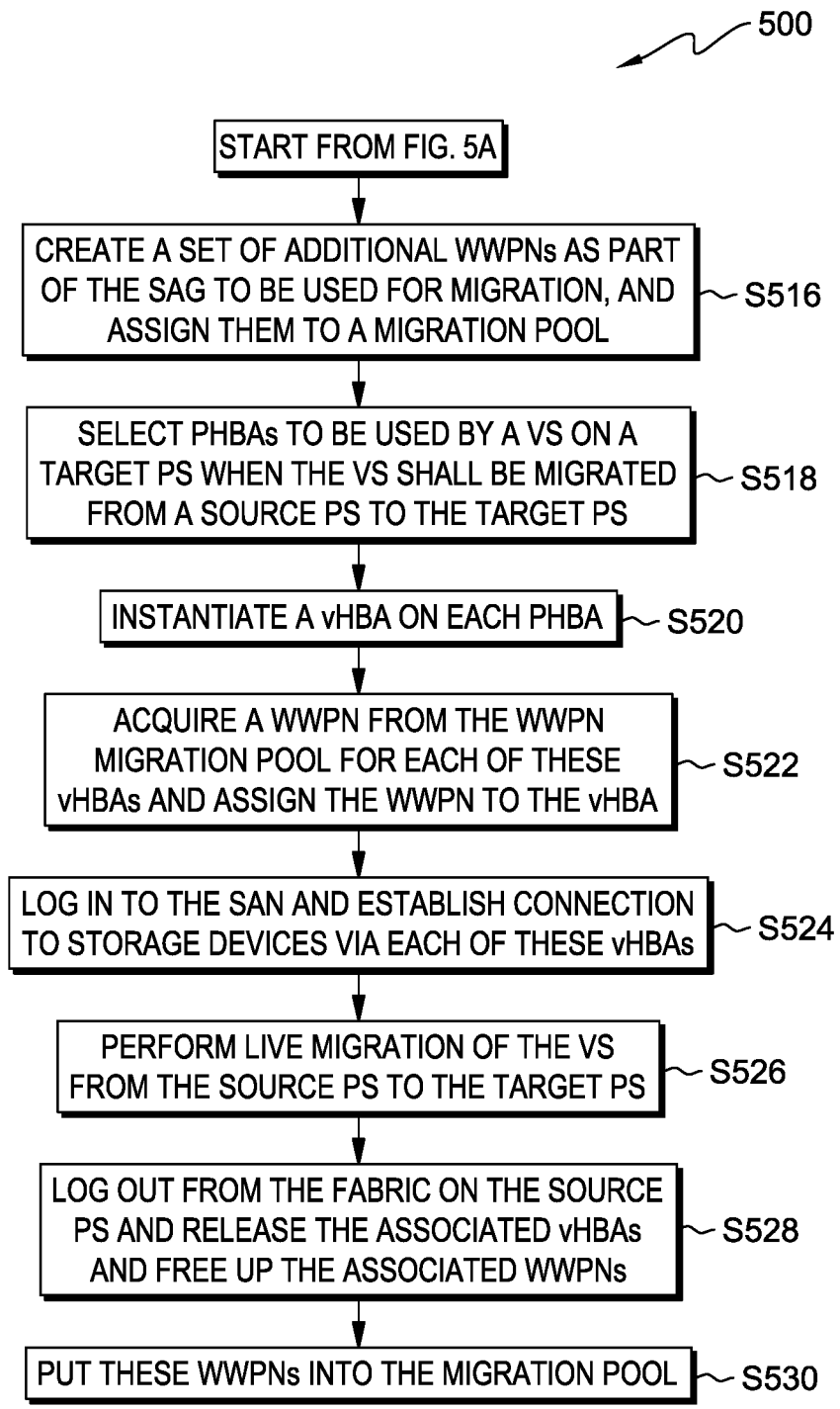
Figure 5C:
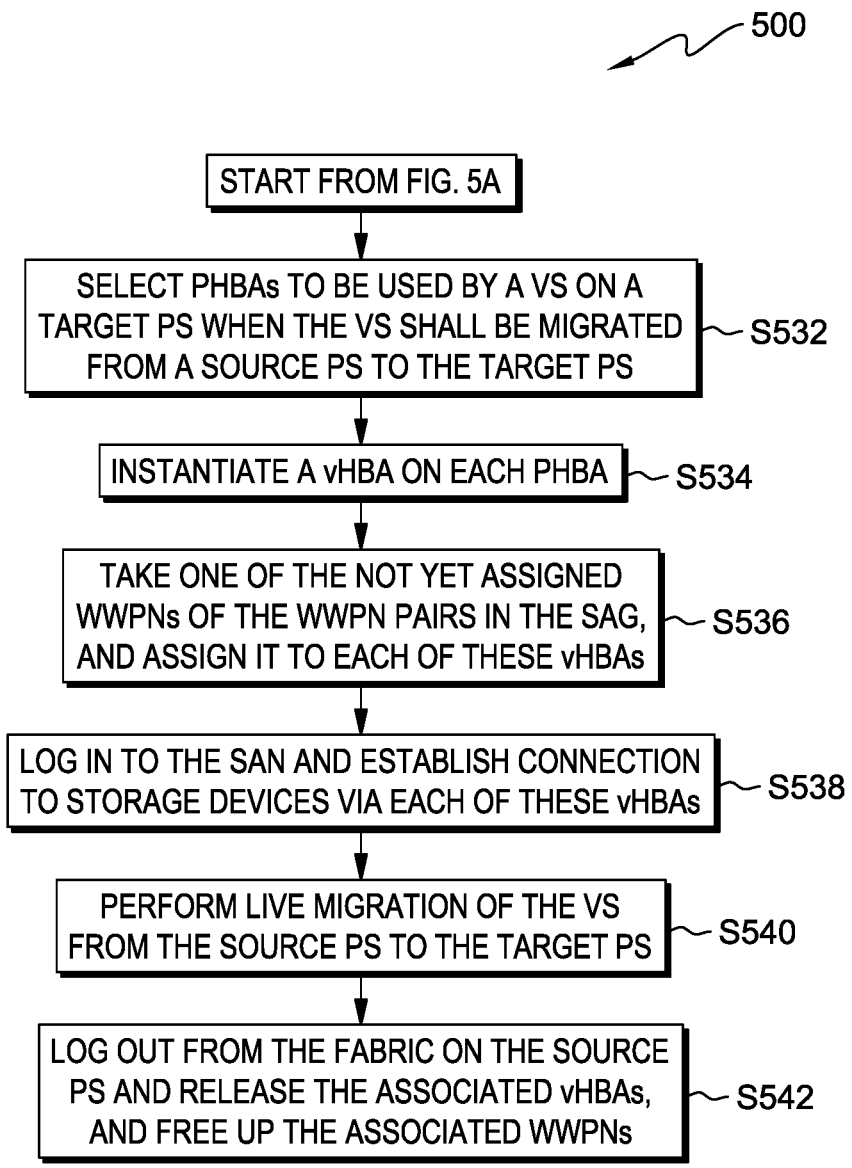
Figure 6:
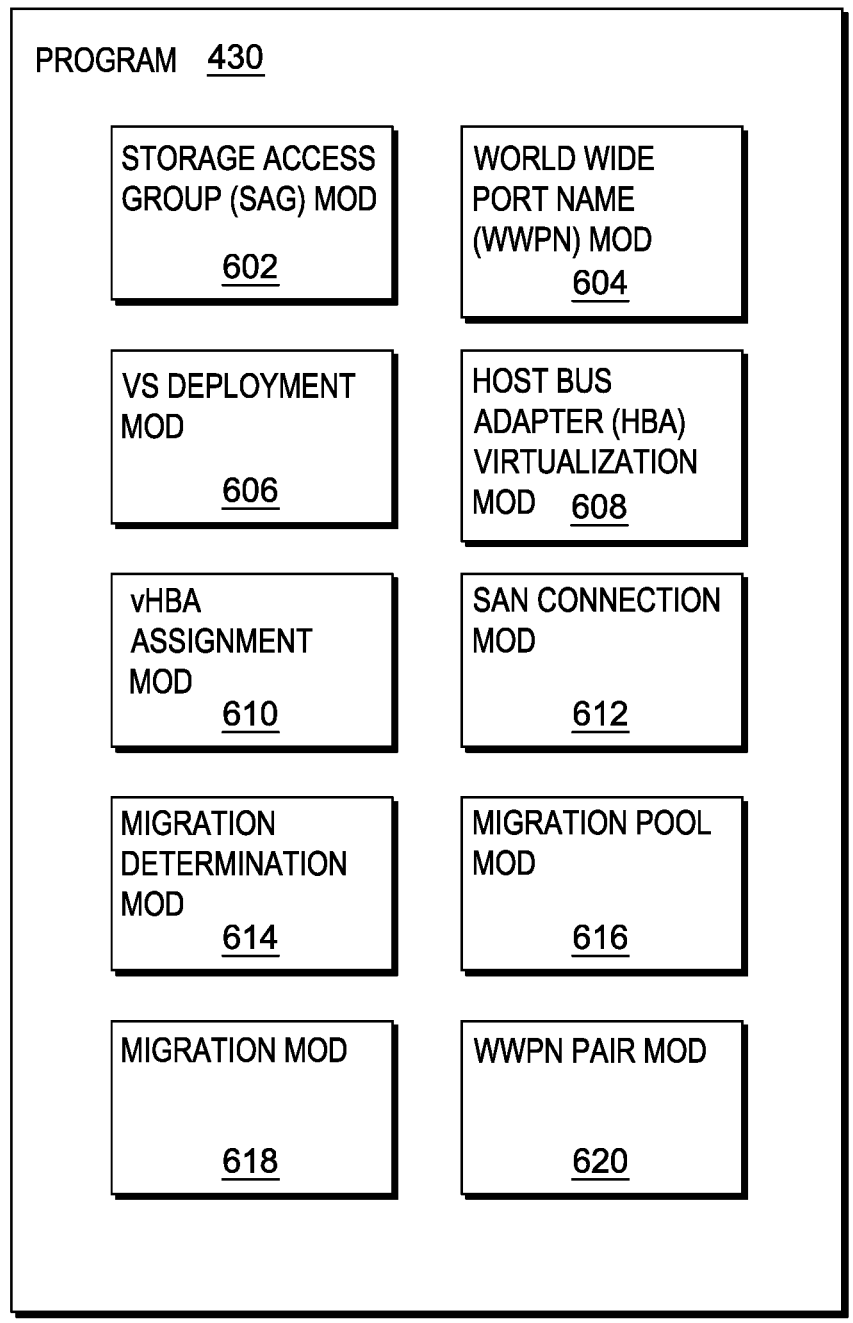
FIG. 6 is a schematic view of a machine logic (for example, software) portion of the second embodiment system.

FIGS. 5A, 5B, and 5C show flowchart 500 depicting a second method according to the present invention. FIG. 6 shows program 430 for performing at least some of the method steps of flowchart 500. This method and associated software will now be discussed, over the course of the following paragraphs, with extensive reference to FIGS. 5A, 5B, and 5C (for the method step blocks) and FIG. 6 (for the software blocks).

Processing begins at step S502, where storage access group (SAG) module 602 defines SAGs including: (i) one or more PSs; (ii) VSs on the one or more PSs; and (iii) HBAs that can be used by these VSs, on one or more PSs, to access a set of storage resources. In this example, virtual server 410 runs on two physical servers 406, 408 to access two storage devices 416, 418 via SAN 412. Virtual server 410 runs on PS 406 using HBAs 402, 404 and on PS 408 using HBAs 436, 438. The corresponding SAG is shown in Table 1, including: VS 410; HBAs 402, 404, 436, 438; and storage devices 416, 418. Some embodiments of the present invention define SAGs that include large numbers of VSs that run on various PSs, each of which uses multiple HBAs to access storage devices via multiple SANs in an enterprise environment. For example, 1000 VSs running on 20 PSs having 4 HBAs on each PS can result in 80,000 WWPNs. Accordingly, access control (including zoning and/or LUN masking) must be set up for 80,000 WWPNs.

TABLE 1

Example SAG defined in step S502.
SAG

| Virtual Servers | VS 410 |
|---|---|
| Storage devices | 416, 418 |
| HBAs | 402, 404, 436, 438 |

Processing proceeds to step S504, where WWPN module 604 creates a set of WWPNs for each VS in the SAGs corresponding to the maximum number of storage access paths of the VS. Alternatively, in some embodiments of the present invention, module 604 creates a set of WWPN pairs for each access path of the VS if unlimited concurrent migrations are required. As discussed herein, VS 410 executes on PS 406 having HBAs 402, 404 and on PS 408 having HBAs 436, 438. A set of two WWPNs (e.g., w410a1, w410b1) are created and assigned to VS 410 as shown in Table 2.

TABLE 2

A set of WWPNs created in step S504.

| PS | HBA | vHBA | VS 410 |
|---|---|---|---|
| PS 406 | 402 | 432 | W410a1 |
|  | 404 | 434 | W410b1 |
| PS 408 | 436 | 440 | W410a1 |
|  | 438 | 442 | W410b1 |

Processing proceeds to step S506, where VS deployment module 606 deploys VSs on a particular PS. In the exemplary embodiment, as shown in Table 2, for example, VS 410 is deployed on PS 406.

Processing proceeds to step S508, where HBA module 608 instantiates vHBAs on the HBAs of PSs where the VSs are deployed. In some embodiments, an HBA is virtualized to represent a plurality of vHBAs (e.g., vHBA1, vHBA2, etc.). Each vHBA of the plurality of vHBAs may be assigned a unique WWPN. From a SAN and storage controller point of view, vHBAs are treated as HBAs, and access control (such as zoning and LUN masking) is provided on the vHBA base. In the exemplary embodiment, as shown in Table 2, one vHBA is created on each HBA, and accordingly, a unique WWPN is assigned to the vHBA corresponding to each HBA.

Processing proceeds to step S510, where vHBA assignment module 610 assigns a unique WWPN to each vHBA. In the exemplary embodiment, as shown in Table 2, each vHBA is assigned a WWPN. In other embodiments, each vHBA is assigned one WWPN, from each WWPN pair created in step S504, if unlimited migrations of VSs among PSs are required.

Processing proceeds to step S512, where SAN connection module 612 log the VSs to SANs to establish connections to the storage devices via each of the vHBAs. Upon the establishment of connections, VSs access their storage resources stored on the storage devices via each of storage access paths. In some embodiments of the present invention, no migrations are required. In such a case, processing ends at step S512 as the completion of a full VS deployment.

Further embodiments of the present invention are discussed in the paragraphs that follow later. In some embodiments of the present invention, migrations are performed after the full deployment of VSs on PSs in a server cluster environment, as described in the first method according to the present invention. Depending on whether or not the concurrent migration number is limited as, determined in step S514, by migration determination module 614, a first and second method for migration according to the present invention is provided accordingly.

FIG. 5B is a continuation of flowchart 500 from the "no" branch of decision step S514. Processing proceeds to step S516, where WWPN migration pool module 616 creates a set of additional WWPNs as part of SAG to be used for migration, and assign them to a migration pool in migration pool 424 in FIG. 4. Alternatively, in some embodiments for a limited number of concurrent migrations, the additional WWPNs are created during the process of full deployment, for example, in step S504 in FIG. 5A. Such additional WWPNs are then stored, for example, in a WWPN pool, such as WWPN pool 424 in FIG. 4. In this example, VS 410 is deployed on PS 406 using the aforementioned method. A set of additional WWPNs are generated for VS 410 migration (e.g., w410a2 and w410b2) and stored in WWPN migration pool 424.

Processing proceeds to step S518, where SAG module 602 selects HBAs to be used by a VS on a target PS, when the VS shall be migrated from a source PS to the target PS. In this example, VS 410 shall migrate from PS 406 to PS 408 having HBA 436, 438 that can be selected to assign to the VS 410 on the target PS 408.

Processing proceeds to step S520, where HBA virtualization module 608 instantiates a vHBA on each of the selected HBAs. In this example, vHBA 440 is virtualized on HBA 436, and vHBA 442 is virtualized on HBA 438 on target PS 408.

Processing proceeds to step S522, where WWPN migration pool module 616 acquires a WWPN from WWPN migration pool 424 for each of the vHBAs, and vHBA assignment module 610 assigns the WWPN to the vHBA. In this example, the WWPN "w410a2" is acquired and assigned to vHBA 440 on HBA 436 on PS 408 and the WWPN "w410b2" is acquired from the migration pool and assigned to vHBA 442 on HBA 438 on PS 408.

Processing proceeds to step S524, where SAN connection module 612 logs VS 410 into SAN 412 and establishes connections to storage devices 416, 418 via each of the vHBAs.

Processing proceeds to step S526, where migration module 618 performs live migration of VS 410 from source PS 406 to target PS 408. For the duration of the migration, VS 410 uses two WWPNs (a pair of names) for each of its access paths, one for the source physical server and another for the target physical server.

Processing proceeds to step S528, where SAN connection module 612 logs out VS 410 from the fabric on source PS 406 and releases associated vHBAs 432, 434 in order to free up the corresponding WWPNs (i.e., w410a1 and w410b1). VS 410 continues using the assigned WWPNs "w410a2" and "w410b2" on PS 408 for ongoing access to storage devices 416, 418.

Processing ends at step S530, where WWPN migration pool module 616 returns the freed WWPNs (w410a1 and w410b1) to migration pool 424. The returned WWPNs are made available for use by any migrating VS in the SAG.

When the numbers of concurrent VS migrations are unlimited, effectively, two WWPNs forming a WWPN pair are provided for each access path of each VS. In that way, during VS migration, one WWPN from each pair is used for each path on the PS that is the source of the migration. The other WWPN of the WWPN pair is used for each access path on the destination PS. The destination PS is the PS to which the VS is migrating. A pair of WWPNs is permanently assigned to each access path of each VS so that if a VS uses a different number of paths on different PSs, then one WWPN is assigned per the maximum number of access paths that the VS may use. When a VS is deployed on a PS, a vHBA is instantiated on each HBA of the PS that the VS will use, and one of the WWPNs of each WWPN pair is assigned to that vHBA, as-needed.

Accordingly, for unlimited concurrent migrations embodiments, in some embodiments, a set of WWPN pairs corresponding to the maximum number of storage access paths of the virtual server in the SAG are created in the process of full deployment of the VS on a physical server in the SAG, for example, in step S504 of flowchart 500 in FIG. 5A. Alternatively, in some embodiments, instead of creating a set of WWPN pairs simultaneously in the process of full deployment, additional WWPNs corresponding to the maximum number of storage access paths of the virtual server in the SAG are instead generated during the process of full deployment and are stored in a WWPN pair pool (e.g., WWPN pairs 426 in FIG. 4), and are paired with the WWPNs (used for the full deployment of the VS) on-demand prior to each first migration of each virtual server. Alternatively, in some embodiments, additional WWPNs corresponding to the maximum number of storage access paths of the virtual server in the SAG are generated after completion of the process of full deployment and are stored in a WWPN pair pool (e.g., WWPN pairs 426 in FIG. 4), and are paired with the WWPNs (used for the full deployment of the VS) on-demand prior to each first migration of each virtual server.

FIG. 5C is a continuation of flowchart 500 from the "yes" branch of decision step S514. In this exemplary embodiment, referring to FIG. 4, VS 410 having two access paths is deployed on PS 406 having HBAs 402, 404 according to flowchart 500 in FIG. 5A, wherein a set of WWPN pairs are created in step S504 corresponding to the maximum number of storage access paths to the virtual server with the SAG (i.e., two pairs of WWPNs for VS 410), and are assigned one WWPN of each pair to each vHBA in step S510. As shown in Table 3, in this example, two WWPN pairs are created for and assigned to VS 410 as follows: (i) the WWPN pair "w410a1/w410a2" is used for HBA 402; and (ii) the WWPN pair "w410b1/w410b2" is used for HBA 404. vHBA 432 is created on HBA 402 on PS 406 and is assigned WWPN "w410a1." vHBA 434 is created on HBA 404 on PS 406 and is assigned WWPN "w410b1." When VS 410 migrates from source PS 406 to target PS 408 (having two HBAs 436, 438), steps in flowchart 500 as shown in FIG. 5C are executed as follows.

TABLE 3

A set of WWPN pairs created according to step S504.

| PS | HBA | vHBA | VS 410 | VS 410 Deployment |
|---|---|---|---|---|
| PS 406 | 402 | 432 | W410a1/W410a2 | W410a1 |
|  | 404 | 434 | W410b1/W410b2 | W410b1 |
| PS 408 | 436 | 440 |  |  |
|  | 438 | 442 |  |  |

Processing proceeds to step S532, where SAG module 602 selects HBAs 436, 438 to be used by VS 410 on target PS 408 when VS 410 migrates from source PS 406 to target PS 408.

Processing proceeds to step S534, where HBA virtualization module 608 instantiates a vHBA on each of the HBAs selected. In this example, vHBA 440 is virtualized on HBA 436, and vHBA 442 is virtualized on HBA 438 on target PS 408.

Processing proceeds to step S536, where WWPN pair module 620 acquires one of the WWPNs of WWPN pairs store 426 in the SAG and assigns the WWPN to a vHBA. In this example, the WWPN "w410a2" is acquired by the pair module and assigned to vHBA 440 on HBA 436 of PS 408, and the WWPN "w410b2" is acquired by the pair module and assigned to vHBA 442 on HBA 438 of PS 408.

Processing proceeds to step S538, where SAN connection module 612 logs VS 410 in to SAN 412 and establishes connections to storage devices 416, 418 via each of these vHBAs 440, 442.

Processing proceeds to step S540, where migration module 618 performs live migration of VS 410 from source PS 406 to target PS 408. For the duration of the migration, VS 410 uses a fixed pair of WWPNs for each of its access paths, one for the source PS and another for the target PS.

Processing ends at step S542, where SAN connection module 612 logs out VS 410 from the fabric on source PS 406 and releases associated vHBAs 432, 434 to free up the corresponding WWPNs. In this example, when the migration is completed, the associated vHBAs are released, freeing up the associated WWPNs (i.e., w410a1 and w410b1). VS 410 continues using the newly assigned WWPNs (i.e., w410a2 and w410b2) for the vHBAs on PS 408 for continued access to storage devices 416, 418.

While SAGs provide significant advantages in managing SAN access for VSs via vHBAs in a cluster environment, some embodiments of the present invention that use WWPN migration pools, and/or statically assign WWPN pairs (or otherwise assign WWPN pairs) to each access path of a VS, operate without SAGs. However, where there is no SAG architecture, other mechanisms must be used to ensure that the appropriate access rights are established for the WWPNs used on the PSs where the VSs are deployed.

Figure 7:
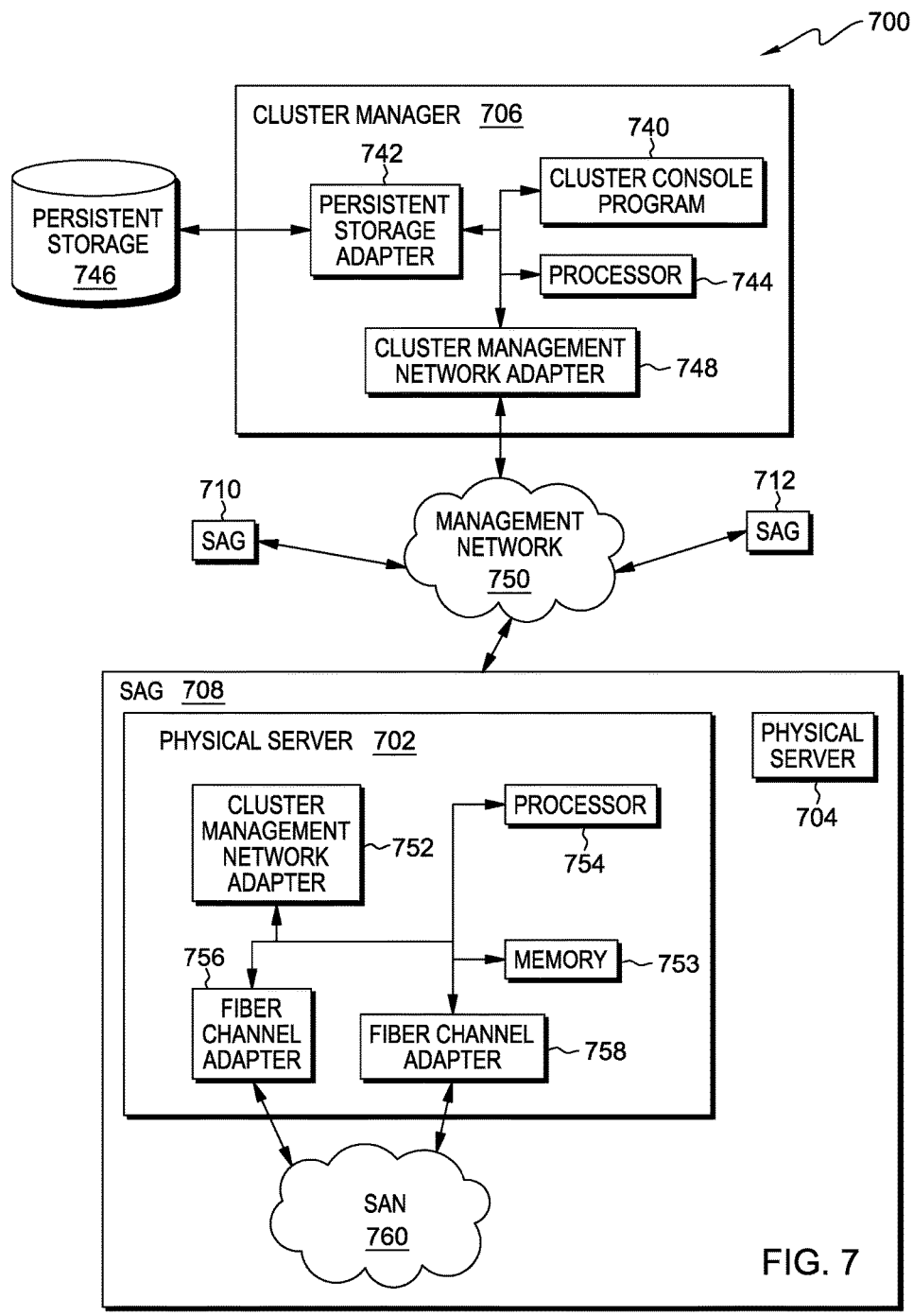
FIG. 7 is a schematic view of a third embodiment of a system according to the present invention.

In the above discussion, embodiments of the present invention are described with respect to a single server cluster, where SAGs may be used for organizing storage access for individual virtual servers, or groups of virtual servers, deployed on the cluster. The discussion that follows introduces likely commercial embodiments where multi-cluster management is employed. Some embodiments of the present invention manage server cluster configuration data, for example, using a cluster management system. FIG. 7 is a functional block diagram illustrating various portions of cluster management system 700, including: clusters 708, 710, 712; physical servers 702, 704; cluster manager 706; cluster console program 740; persistent storage adapter 742; processor 744; persistent storage 746; cluster management network adapter 748; cluster management network 750; cluster management network adapter 752, processor 754, memory 753, fibre channel adapter (i.e., HBAs) 756, 758; and storage area network(s) 760.

Figure 8:
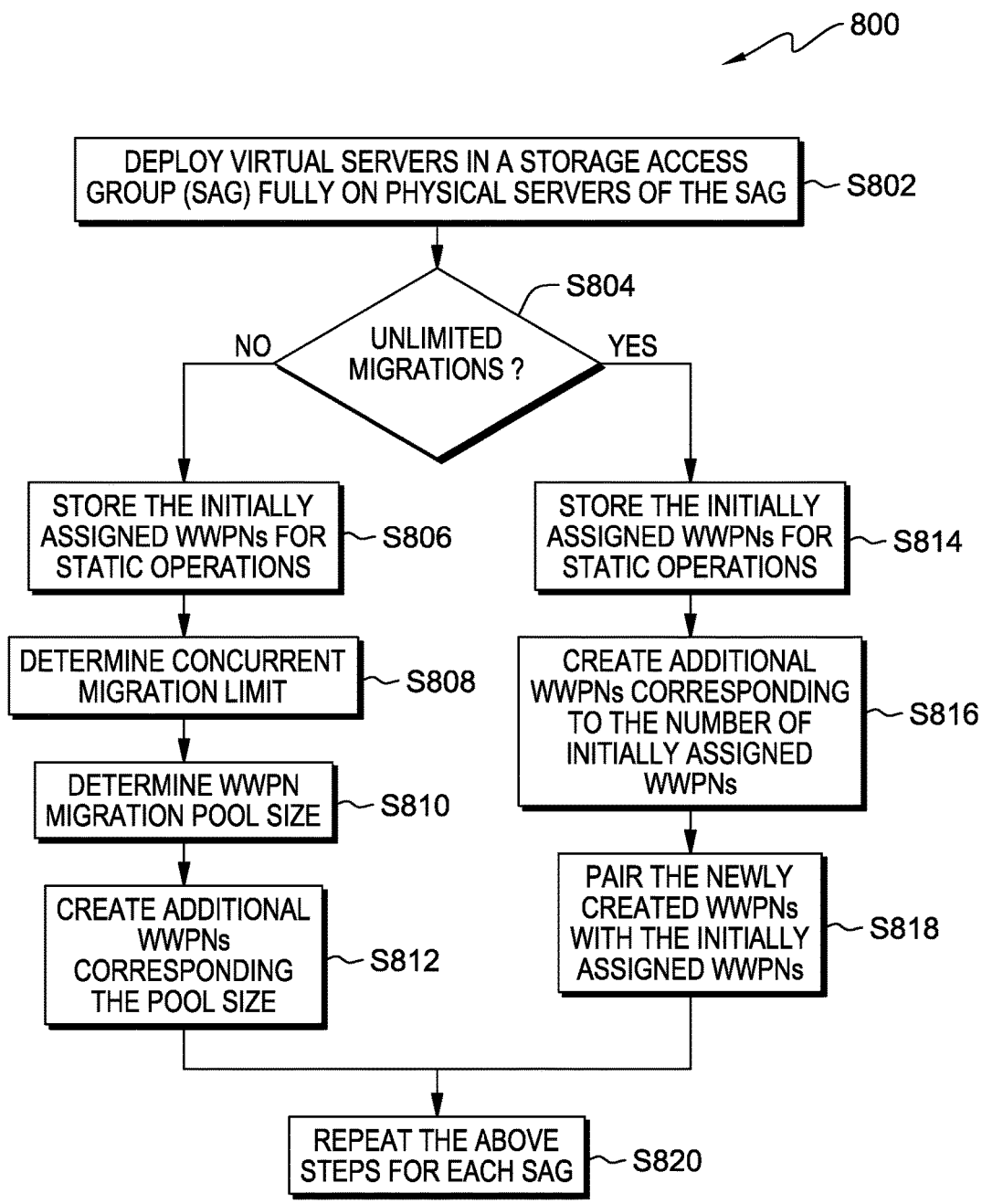
FIG. 8 is a flowchart showing a method performed, at least in part, by the third embodiment system.
Figure 9A:
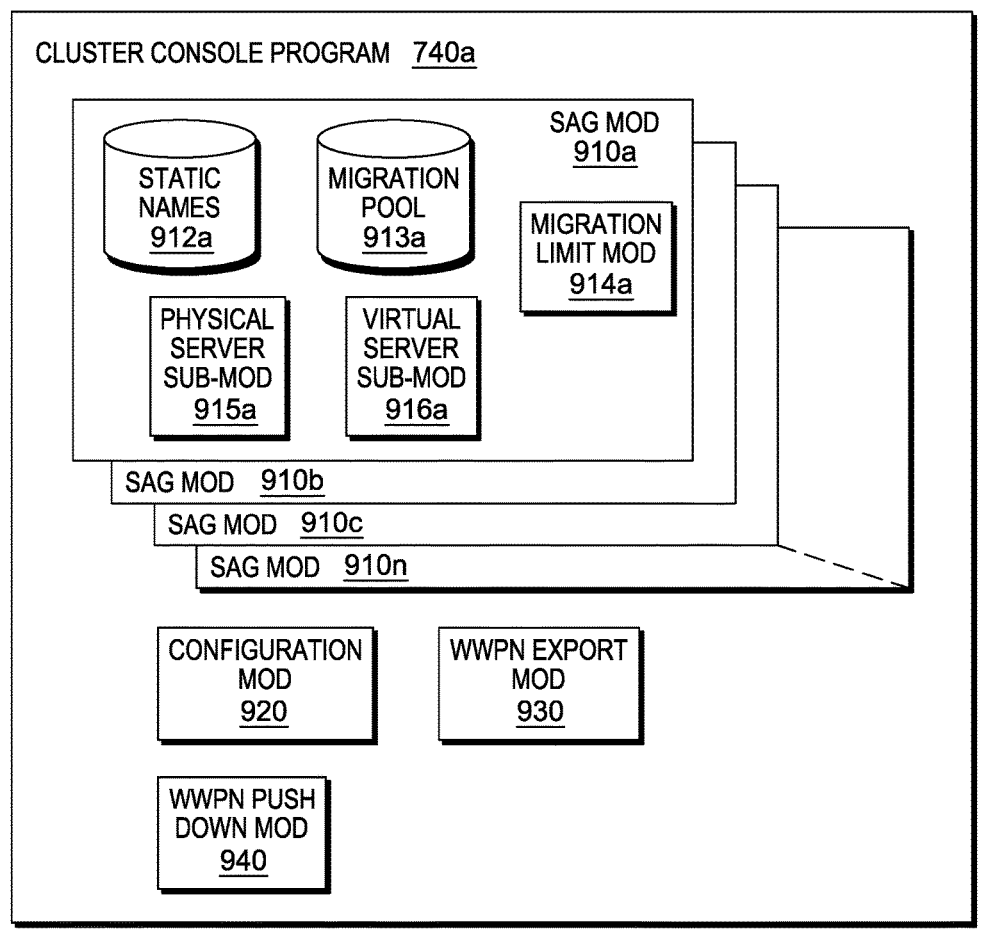
FIG. 9A is a first schematic view of a machine logic (for example, software) portion of the third embodiment system.
Figure 9B:
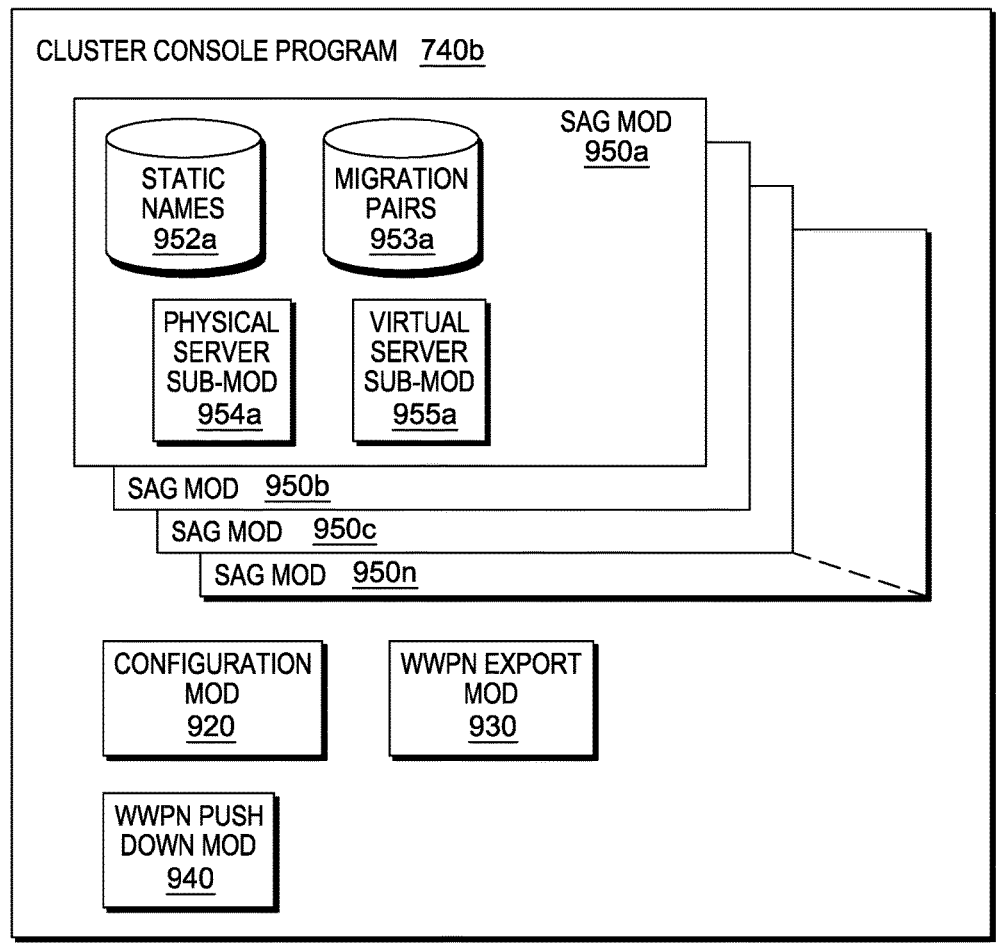
FIG. 9B is a second schematic view of a machine logic (for example, software) portion of the third embodiment system.

FIG. 8 shows flowchart 800 depicting a third method according to the present invention. FIGS. 9A and 9B show programs 740a and 740b for performing at least some of the method steps of flowchart 800. This method and associated software will now be discussed, over the course of the following paragraphs, with reference to FIG. 7 (for the system blocks), FIG. 8 (for the method step blocks), and FIGS. 9A and 9B (for the software blocks).

Cluster configuration data is maintained on cluster manager 706, and persisted on persistent storage 746 (e.g., disk storage) internal to or attached to the manager. Cluster manager 706 is connected to, for example, physical servers 702, 704 of cluster 708 through cluster management network 750. Cluster manager 706 pushes configuration data down to individual physical servers 702, 704 through cluster management network 750, and retrieves physical configuration information as well, as runtime information, from the individual physical servers through network 750. For high availability, both the cluster management console and the cluster management network are, for example, typically deployed in a fully redundant way, employing appropriate data mirroring, backup, and/or restore concepts. Server cluster 708, discussed in detail below, with respect to cluster manager 706, is representative of other server clusters that may be electrically connected to the cluster manager, such as clusters 710 and 712.

Processing begins at step S802, where configuration module 920 deploys virtual servers of a storage access group, on the corresponding cluster, in this example, cluster 708. Virtual servers are fully deployed on the physical servers of the cluster by employing the afore-discussed methods. In this example, during deployment of the virtual servers, configuration module 920 assigns WWPN(s) to fiber channel adapter(s) 756, 758 for a current communication path(s) of the deployed virtual server(s).

Processing proceeds to step S804, where configuration module 920 determines if an unlimited number of concurrent VS migrations are demanded. If "No", then there are a limited number of concurrent VS migrations being considered, so processing proceeds to step S806. If "Yes", processing proceeds to step S814.

According to the "no" decision branch, processing proceeds to step S806, where virtual server sub-module 916a in SAG module 910a stores the WWPN(s) initially assigned to the adapters (such as vHBAs, HBAs) during the full deployment to static names store 912a. These WWPNs remain assigned to the adapters until VS migration occurs.

Processing proceeds to step S808, where migration limit module 914a in cluster console program 740a determines the upper limit of concurrent migrations. The upper limit of concurrent migrations is determined in a conventional manner. The requirement for a certain number of concurrent migrations is a characteristic of the workload and the processing environment. For instance, some workloads are dynamically moved around within a cluster, which calls for a high number of concurrent migrations, while others are more static. Also, in preparation for a physical server shutdown, some environments require that the workload be quickly moved to other servers, which again calls for a high number of concurrent migrations, while in other environments it may be acceptable to do that piece by piece. For a high number of concurrent migrations, a larger number of WWPNs are required and need to be configured, which means higher effort for the administrators. Also, the maximum number of WWPNs per SAN or per Fibre Channel switch is typically limited. Therefore, administrators try to avoid using and configuring more WWPNs than required.

Processing proceeds to step S810, where virtual server sub-module 916a determines the number of WWPNs to be stored in migration pool 913a. The size of the WWPN migration pool is defined by: (i) the upper limit, N, of concurrent VS migrations that need to be supported; and (ii) the maximum number of parallel access paths that a VS may use on any PS (i.e., the number of adapters) in the SAG. In this example, both of these values are specified by the administrator. Alternatively, the upper limit value and/or the parallel paths value is determined by corporate policy, or by an architect during program development. Thus, the number of WWPNs required in the migration pool is:

$$\Sigma(p_i), (i=1, \ldots, N),$$

where N is the maximum number of concurrent migrations, and $p_i$ (i=1, ..., N) are the number of parallel access paths of those VSs for which the maximum number of parallel access paths is specified. For example, when sorting the VSs by the number of access paths they have specified, this is the sum of the access paths of the top VSs according to such a list.

Processing proceeds to step S812, where physical server sub-mod 915a creates a set of additional WWPNs for the SAG, and manages these additional WWPNs in migration pool 913a. As discussed in more detail above, during VS migration, these WWPNs are dynamically assigned to the adapters (such as vHBAs) of the destination physical servers within the cluster where the virtual servers are to be migrated. WWPNs for migrations are taken from the WWPN migration pool as-needed to perform VS migrations. When the VS migrations are completed, the WWPNs that are taken from the WWPN migration pool to accomplish the migrations, become the WWPNs used for static operation. These WWPNs are stored in static names database 912a. Further, the WWPNs that had previously been used for static operation are moved to WWPN migration pool 913a.

Processing ends at step S820, where the above steps are performed for the virtual servers of each of other SAGs of cluster 708, via SAG modules 910b, 910c, through 910n, where "n" is the number of SAGs defined for server cluster 708. Corresponding operations may be performed for virtual servers to be deployed on server clusters 710, 712, managed by cluster manager 706.

Some embodiments of the present invention where WWPN management using WWPN migration pools may be included in the cluster console program 740a: (i) a physical configuration retrieval facility, such as configuration module 920, to determine the eligible HBAs on each physical server; (ii) a WWPN export facility, such as WWPN export module 930, to convey the WWPNs for SAN configuration to administrators; and (iii) a WWPN pushdown facility, such as WWPN pushdown module 940, to assign WWPNs to the vHBAs hosted by HBAs on physical servers. Each SAG that is defined for a virtual server or group of virtual servers includes, but is not limited to: (i) a set of WWPNs for static operation (static names database 912a); (ii) a set of WWPNs for migration of each of the VSs among the physical servers defined in the SAG (migration pool 913a); (iii) a set of HBAs (such as adapters 756, 758) that are used for each of the physical servers in the SAG; and (iv) an upper limit for the number of concurrent migrations (for example, determined by migration limit module 914a).

As noted herein, some embodiments of the present invention apply to scenarios where unlimited concurrent migrations of virtual servers are available among the physical servers defined in the associated SAG. Returning to decision step S804 and continuing from the "yes" decision branch, processing proceeds to step S814, where virtual server sub-module 955a in SAG module 950a stores the WWPN(s) initially assigned to the adapters (such as vHBAs, HBAs) during full deployment to static names store 952a. These WWPNs remain assigned to the adapters until VS migration occurs.

Processing proceeds to step S816, where physical server sub-module 954a creates additional WWPNs corresponding to the number of initially assigned WWPNs. In this example, where each migrating virtual server is associated with a permanent pair of WWPNs, the number of WWPNs is directly proportional to the number of virtual servers.

Processing proceeds to step S818, where virtual server sub-mod 955a pairs the WWPNs created in step S816 with an initially assigned WWPN prior to the migration of a corresponding virtual server. After a migration has completed, the WWPNs of each WWPN pair are swapped. That is, the WWPNs that had been activated for the migration process (from migration pairs database 953a) are now used for static operation process (stored in static names database 952a) on the target physical server, and the WWPNs that had been used for static operation on the previous PS now become inactive (transferred to migration pairs database 953a) and ready to be used for a subsequent migration. In this embodiment, the pair of names are permanently paired for ongoing migration. Alternatively, a new pairing is generated (as in step S818) upon each migration of the virtual server.

Processing ends at step S820 where the above steps are performed for each of other SAGs of server cluster 708 via SAG modules 950b, 950c, through 950n, where "n" is the number of SAGs defined for server cluster 708. Corresponding operations may be performed for virtual servers to be deployed on server clusters 710, 712, managed by cluster manager 706.

WWPN management using permanently assigned WWPN pairs, for example, as shown above, may include: (i) a physical configuration retrieval facility (such as configuration module 920) to determine the eligible HBAs on each physical server; (ii) a WWPN export facility (such as WWPN export module 930) to convey the WWPNs for SAN configuration to administrators; (iii) and a WWPN pushdown facility (such as WWPN push down module 940) to assign WWPNs to the vHBAs hosted by HBAs on physical servers. No WWPN migration pools are required. Each SAG contains, but is not limited to, a set of WWPNs pairs for each of its virtual server: one for static operation, and one for migration operation that is used during a VS migration process only.

For determination of the number of WWPNs required for deployment and migration of virtual servers on physical servers in the server cluster, different approaches may be used. In some embodiments of the present invention, WWPNs are permanently assigned to vHBAs in the SAGs. For example, if there are 1000 virtual servers each being able to run on 20 physical servers using 4 HBAs on each physical server, the resulted WWPNs are $80,000^{(1000*20*4)}$. In some embodiments of the present invention for the same scenario, if the virtual servers are distributed across 10 SAGs with 100 virtual servers per SAG, and WWPN migration pools are employed to support up to 10 concurrent migrations per SAG, the resulted WWPNs are $4,400^{((1000*4)+(10*10*4))}$, which depends on the number of SAGs and the distribution of virtual servers across SAGs. In other embodiments of the present invention for the same scenario, using a WWPN migration pool supporting the maximum of 1000 concurrent migrations results in $8,000^{(1000*4*2)}$ WWPNs, which is independent of the number of SAGs and how virtual servers are distributed across SAGs. Thus, a considerable number of WWPNs can be saved, in particular when virtual servers are potentially able to execute on a large number of physical servers in a cluster. Accordingly, a considerable amount of SAN administration work may be reduced, and SAN hardware can be saved when the maximum number of WWPNs that can be supported by certain components (e.g., SAN switches, storage controllers) is exhausted.

Some embodiments of the present invention may include one, or more, of the following features, characteristics and/or advantages: (i) the expected capability of a VS to access all its storage devices on each PS on which the VS could be deployed, and via all the selected HBAs, can be verified when a SAG is created or modified, and/or when a VS is added to a SAG, and/or when a PS on which the VS can be deployed is activated; (ii) prior to a VS migration, it can be verified if access on the potential target PS (still) exists; (iii) a simplified system and SAN management scheme can be applied without restrictions; (iv) the server cluster may include one, or more, PSs of different types; (v) each PS may contain hypervisors of different types to provide different kinds of virtualization capabilities; and (vi) the scheme can also be applied in an environment where multiple hypervisors (HVs) are deployed on a single PS in a hierarchical way, and consequently, everything discussed previously regarding PSs also applies to hypervisors (VS can be migrated from one HV to another HV on the same or a different PS); (vii) provides for creating one, or more, SAGs by specifying the virtual machines that shall have access to a set of storage resources, the host computer systems on which the virtual machines can be executed, the host bus adapters of the host computers, which shall be used for accessing the storage area network, and the maximum number of storage access paths on a single host computer system for each virtual machine; (viii) provides a set of WWPNs for the storage area network, such that the WWPNs equal the maximum number of storage access paths; (ix) a vHBA is instantiated for each HBA when executing a virtual machine as specified by a SAG on one or the host computer systems specified by the SAG; (x) for each instantiated vHBA, assigns one port name from the assigned set of port names for the virtual machine; (xi) for each SAG, a set of additional WWPNs for the storage area network are assigned to a migration pool, such that the number of WWPNs in the migration pool meets a predetermined count; (xii) migration pool size is determined by a maximum number of concurrent virtual machine migrations, and a maximum number of vHBAs, a given virtual machine can consume on any host computer system; and/or (xiii) when migrating a virtual machine, which is specified by a SAG, from a first host computer system to a second host computer system, which are both specified by the same SAG, port names from the migration pool are assigned to this virtual machine for use on the second host computer system.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Computer system cluster: an arrangement of physical servers with connectivity to storage devices in a SAN environment, where virtual machines may be deployed on the physical servers of the cluster.

Storage Access Group (SAG): an arrangement of a set virtual servers, a set of physical servers within a server cluster on which these virtual servers can be deployed, HBAs installed on these physical servers that can be used by the virtual servers to access a common set of SAN-attached storage resources, and port names that can be associated with these HBAs, or with vHBAs instantiated on these HBAs, where appropriate access rights are ensured for these port names used on any physical servers where corresponding virtual machines may be deployed.

What is claimed is:

1. A method for assigning a set of network names to storage access paths of virtual machines accessing storage resources via storage area networks, the method comprising:
   identifying a maximum number of storage access paths that each virtual machine of a plurality of virtual machines is able to use on any server among a plurality of servers;
   for each virtual machine of the plurality of virtual machines:
      assigning a plurality of source port names equal to the maximum number of storage access paths that the virtual machine can use on any of the plurality of servers;
   selecting a maximum number of concurrent live-migrations between the plurality of virtual machines; and
   generating a plurality of target port names, wherein a quantity of the plurality of target port names is based on the product of:
      the maximum number of storage access paths that the virtual machine can use on any of the plurality of servers; and
      the maximum number of concurrent live-migrations between the plurality of virtual machines.

2. The method of claim 1, further comprising selectively deploying the plurality of virtual machines on the plurality of servers.

3. The method of claim 1, further comprising storing the plurality of target port names in a port name pool.

4. The method of claim 1, further comprising:
   performing a live migration of a virtual machine from a source server to a target server; and
   dynamically assigning at least one target port name from the port name pool to the virtual machine.

5. The method of claim 4, further comprising:
   responsive to the virtual machine completing the live migration from the source server to the target server, storing the source port name of the virtual machine as a target port name in the port name pool.

6. The method of claim 1, wherein each storage access path is established by instantiating a virtual host bus adaptor of the virtual machine on a host bus adaptor of the server.

7. The method of claim 6, wherein:
   each virtual host bus adaptor to be instantiated on each server of the plurality of servers is defined in a storage access group; and
   each port name assigned to each virtual machine from the port name pool is defined in the storage access group.

8. A computer program product for assigning a set of network names to storage access paths of virtual machines accessing storage resources via storage area networks, the computer program product comprising a computer readable storage medium having stored thereon:
   first program instructions programmed to identify a maximum number of storage access paths that each virtual machine of a plurality of virtual machines is able to use on any server among a plurality of servers;
   second program instructions programmed, for each virtual machine of the plurality of virtual machines, to assign a plurality of source port names equal to the maximum number of storage access paths that the virtual machine can use on any of the plurality of servers;

third program instructions programmed to select a maximum number of concurrent live-migrations between the plurality of virtual machines;

fourth program instructions programmed to generate a plurality of target port names, wherein a quantity of the plurality of target port names is based on the product of:

the maximum number of storage access paths that the virtual machine can use on any of the plurality of servers; and the maximum number of concurrent live-migrations between the plurality of virtual machines.

9. The computer program product of claim 8, further comprising fifth program instructions programmed to selectively deploy the plurality of virtual machines on the plurality of servers.

10. The computer program product of claim 8, further comprising sixth program instructions programmed to store the plurality of target port names in a port name pool.

11. The computer program product of claim 8, further comprising seventh program instructions programmed to:

perform a live migration of a virtual machine from a source server to a target server; and dynamically assign at least one target port name from the port name pool to the virtual machine.

12. The computer program product of claim 11, further comprising eighth program instructions programmed to:

store the source port name of the virtual machine as a target port name in the port name pool in response to the virtual machine completing the live migration from the source server to the target server.

13. The computer program product of claim 8, wherein each storage access path is established by instantiating a virtual host bus adaptor of the virtual machine on a host bus adaptor of the server.

14. The computer program product of claim 13, wherein:

each virtual host bus adaptor to be instantiated on each server of the plurality of servers is defined in a storage access group; and each port name assigned to each virtual machine from the port name pool is defined in the storage access group.

15. A computer system for assigning a set of network names to storage access paths of virtual machines accessing storage resources via storage area networks, the computer system comprising:

a processor(s) set; and a computer readable storage medium;

wherein:

the processor(s) set is structured, located, connected, and/or programmed to run program instructions stored on the computer readable storage medium;

the program instructions include:

first program instructions programmed to identify a maximum number of storage access paths that each virtual machine of a plurality of virtual machines is able to use on any server among a plurality of servers;

second program instructions programmed, for each virtual machine of the plurality of virtual machines, to assign a plurality of source port names equal to the maximum number of storage access paths that the virtual machine can use on any of the plurality of servers;

third program instructions programmed to select a maximum number of concurrent live-migrations between the plurality of virtual machines;

fourth program instructions programmed to generate a plurality of target port names, wherein a quantity of the plurality of target port names is based on the product of:

the maximum number of storage access paths that the virtual machine can use on any of the plurality of servers; and the maximum number of concurrent live-migrations between the plurality of virtual machines.

16. The computer system of claim 15, further comprising fifth program instructions programmed to selectively deploy the plurality of virtual machines on the plurality of servers.

17. The computer system of claim 15, further comprising sixth program instructions programmed to store the plurality of target port names in a port name pool.

18. The computer system of claim 15, further comprising seventh program instructions programmed to:

perform a live migration of a virtual machine from a source server to a target server; and dynamically assign at least one target port name from the port name pool to the virtual machine.

19. The computer system of claim 18, further comprising eighth program instructions programmed to:

store the source port name of the virtual machine as a target port name in the port name pool in response to the virtual machine completing the live migration from the source server to the target server.

20. The computer system of claim 15, wherein each storage access path is established by instantiating a virtual host bus adaptor of the virtual machine on a host bus adaptor of the server.

* * * * *